(12) United States Patent
Zohar et al.

(10) Patent No.: US 7,698,591 B2
(45) Date of Patent: Apr. 13, 2010

(54) METHOD AND APPARATUS FOR ENSURING DATA INTEGRITY IN REDUNDANT MASS STORAGE SYSTEMS

(75) Inventors: Ofir Zohar, Alfe-Menashe (IL); Yaron Revah, Tel-Aviv (IL); Haim Helman, Ramat Gan (IL); Dror Cohen, Tel Aviv (IL); Shemer Schwartz, Herzelia (IL); Kariel Sendler, Bat Hefer (IL)

(73) Assignee: International Business Machines Corporation, Armonk, NY (US)

( * ) Notice: Subject to any disclaimer, the term of this patent is extended or adjusted under 35 U.S.C. 154(b) by 700 days.

(21) Appl. No.: 11/212,436

(22) Filed: Aug. 26, 2005

(65) Prior Publication Data

US 2007/0050667 A1   Mar. 1, 2007

(51) Int. Cl.
*G06F 11/00* (2006.01)
(52) U.S. Cl. ............................................ 714/6
(58) Field of Classification Search ............ 714/6, 714/7
See application file for complete search history.

(56) References Cited

U.S. PATENT DOCUMENTS

| | | | | |
|---|---|---|---|---|
| 5,410,545 A | * | 4/1995 | Porter et al. | 714/723 |
| 5,495,491 A | * | 2/1996 | Snowden et al. | 714/764 |
| 5,632,012 A | * | 5/1997 | Belsan et al. | 714/6 |
| 5,978,952 A | * | 11/1999 | Hayek et al. | 714/764 |
| 7,263,631 B2 | * | 8/2007 | VanBuren | 714/15 |
| 2001/0047497 A1 | * | 11/2001 | Larson et al. | 714/42 |
| 2005/0060603 A1 | * | 3/2005 | Pomaranski et al. | 714/7 |
| 2005/0073884 A1 | * | 4/2005 | Gonzalez et al. | 365/185.02 |
| 2006/0212778 A1 | * | 9/2006 | Wheeler et al. | 714/764 |
| 2006/0218199 A1 | * | 9/2006 | Kishi | 707/200 |
| 2006/0271743 A1 | * | 11/2006 | Clark et al. | 711/141 |
| 2007/0022244 A1 | * | 1/2007 | Kimmery | 711/106 |

* cited by examiner

*Primary Examiner*—Scott T Baderman
*Assistant Examiner*—Yair Leibovich
(74) *Attorney, Agent, or Firm*—Griffiths & Seaton PLLC

(57) ABSTRACT

A method for maintaining integrity of data in a redundant mass storage system is provided that includes selecting a plurality of scrubbing selections for a memory system in which each of the scrubbing selections selects a data section on the memory system. The method also includes selecting a respective scrubbing implementation for each scrubbing selection in which each of the scrubbing implementations determines a data check. Another exemplary method is provided for ensuring integrity of data stored in a redundant mass storage system. An apparatus is provided for maintaining data integrity in a redundant mass storage system. A computer-readable storage medium containing a set of instructions for a general purpose computer is provided. The set of instructions include a method for ensuring data integrity in a redundant mass storage system.

13 Claims, 7 Drawing Sheets

| Process ID (231) | Disk ID (232) | Selection Type (233) | Implementation Type (234) | Latest Partition Handled (235) | Timestamp (236) | Last Cycle Start Time (237) |
|---|---|---|---|---|---|---|
| | | | | | | |
| 13 | 4 | Full | Normal | 24/YYY2 | TTTTT | RRRRRR |
| | | | | | | |
| j | DN | ST | IT | LUNA/PPPP | TTTT1 | RRRRR1 |
| | | | | | | |
| | | | | | | |
| | | | | | | |
| | | | | | | |

| Partition ID | Partition Address Range | Primary Location | Secondary Location | |
|---|---|---|---|---|
| ........ | ........ | ........ | ........ | |
| 23/XXX1 | 23/L9EEE1E0-LAEEE1E0 | C9-D3 | C1-D5 | |
| ........ | ........ | ........ | ........ | |
| 24/YYY2 | 24/LDFFF3E8-LEFFF3E8 | C9-D13 | C5-D4 | |
| ........ | ........ | ........ | ........ | |
| 25/ZZZ3 | 25/LADDD5E1-LBDDD5E1 | C1-D7 | C5-D7 | |
| ........ | ........ | ........ | ........ | |
| 26/TTT4 | 26/L0EEE2E0-L1EEE2E0 | C1-D6 | C9-D2 | |
| | | | | |

| Partition ID | Partition Address Range | Location on Disk | Alternative Location | | SFa | SFb |
|---|---|---|---|---|---|---|
| 21/AAA6 | 21/L9EEE1E0-LAEEE1E0 | P20BBBB | C2-D3 | | | |
| 24/YYY2 | 24/LDFFF3E8-LEFFF3E8 | P2100AAA | C5-D4 | | | |
| 24/PPP1 | 24/LADDD5E1-LBDDD5E1 | P300A1220 | C1-D9 | | | |
| 30/RRR3 | 30/L0EEE2E0-L1EEE2E0 | P41AAA111 | C6-D7 | | | |
| | | | | | | |

Cache 9 - Disk 13

FIG. 5

| Process ID 231 | Disk ID 232 | Selection Type 233 | Implementation Type 234 | Latest Partition Handled 235 | Timestamp 236 | Last Cycle Start Time 237 |
|---|---|---|---|---|---|---|
| 13 | 4 | Full | Normal | 24/YYY2 | TTTTT | RRRRR |
| j | DN | ST | IT | LUNA/PPPP | TTTT1 | RRRRR1 |
| | | | | | | |
| | | | | | | |
| | | | | | | |
| | | | | | | |
| | | | | | | |
| | | | | | | |

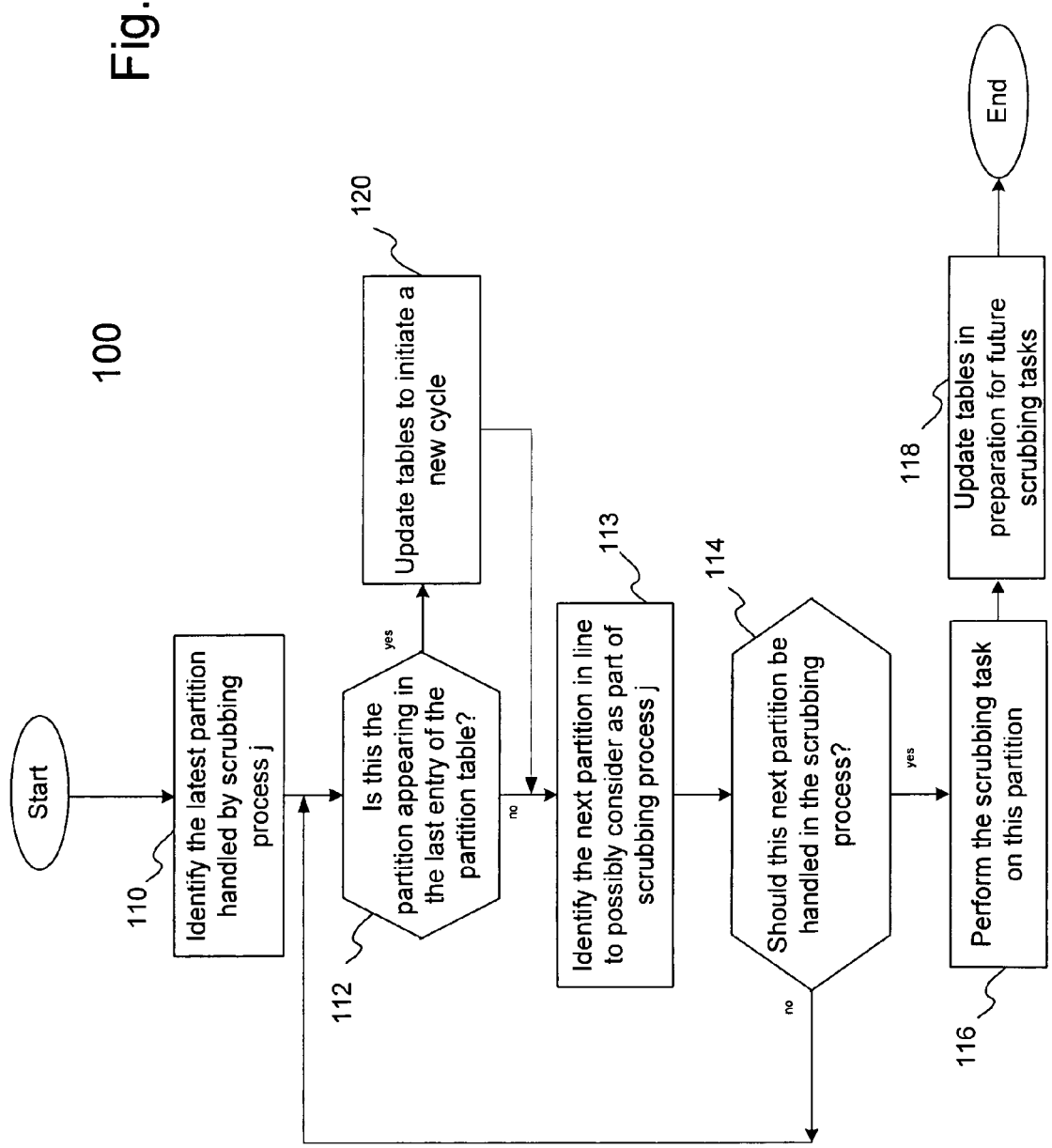

METHOD AND APPARATUS FOR ENSURING DATA INTEGRITY IN REDUNDANT MASS STORAGE SYSTEMS

FIELD OF THE INVENTION

The present invention relates generally to data storage systems with redundancy, and specifically to actions taken to detect and correct data integrity problems in such systems.

BACKGROUND OF THE INVENTION

Data redundancy is used in data storage systems to protect customer's data against individual component malfunction. If any data portion stored in the system is stored in two or more separate physical copies located at separate components, such as disk drives, then data will not be lost if one of these components fails or malfunctions, since the host can still obtain the requested data from the remaining copy or copies. Mechanisms for ensuring and maintaining data integrity are implemented in such systems.

One approach used for preserving data integrity is known as "scrubbing", typically embodied in software applications that run as background processes and check that all existing copies of data portions are correct and can be safely read. If any copy of the data is unavailable, corrupted, or inaccurate, it is then corrected, typically by being overwritten with data taken from readable and correct copy or copies of the data.

In the known art, scrubbing processes are typically implemented by systematically scanning all data stored in the system, in cycles that may take one or more week before being completed. On the other hand, data that was recently modified is more likely to become corrupted or unavailable.

There is therefore a need for procedures that ensure data integrity in mass storage systems which attend more frequently to data portions that are more likely to be corrupted or unavailable.

SUMMARY OF THE INVENTION

In embodiments of the present invention, a data storage system comprises a group of mass storage devices which store respective data therein, the data being accessed by one or more hosts transmitting input/output (IO) requests to the storage system. The data is stored redundantly in the system, so that at least two mass storage devices each have a copy of the data. The IO requests comprise IO write requests, wherein data is written redundantly to at least two mass storage devices, and IO read requests, wherein data is read from one of the devices.

The storage system implements scrubbing mechanisms that run as background processes of relatively low priority to check if data can be read from the disks and if the data that has been read is correct. The redundancy of data in the system can be used to correct data that turns out to be unreadable or incorrect. The mechanisms allow checking more frequently those data portions in the system that are more likely to have been corrupted. Moreover, the system is able to implement more than one type of such mechanisms and to run them in parallel or successively according to parameters related with the system's overall activity.

There is therefore provided, according to an embodiment of the present invention, a method for maintaining integrity of data in a redundant mass storage system. The method includes selecting a plurality of scrubbing selections for a memory system, each of the scrubbing selections selecting a data section on the memory system and selecting a respective scrubbing implementation for each scrubbing selection, each of the scrubbing implementations determining a data check.

This method may include performing at least one of the scrubbing implementations on the portion of the data selected by the associated scrubbing selection; identifying each datum of the data portion as one of faulty and not faulty using the data check of the at least one scrubbing implementation; and repairing each datum identified as faulty.

The method may also include initiating one of the scrubbing implementations based on a criteria comprising at least one of: a minimal time span since a last completion of the performing of the scrubbing implementation; a minimal time span since the last initiation of the performing of the scrubbing implementation; a minimal time span since a further last completion of the performing of any scrubbing implementation; a minimal time span since a further last initiation of the performing of any scrubbing implementation; an overall activity load in a memory system controller adapted to read and write to the memory system; a further overall activity load in the system; and a starvation-avoidance criteria including a maximum time between scrubbing implementations.

Identifying datum as faulty may be based on at least one of: the datum cannot be read from the memory system; the datum cannot be read from the memory system within a given time limit; the data check provides a negative response; the datum of the data portion does not agree with a further datum of a corresponding data portion from an alternative location; and a metadata of the data portion does not agree with a further metadata of the corresponding data portion from the alternative location.

Repairing each datum identified as faulty may comprise at least one of: taking no action; issuing a message to a user or to a system manager indicating that a faulty situation has been identified; and overwriting the datum of the data portion with a further datum of a corresponding data portion from an alternative location.

The scrubbing selections may select at least one of the following: all of the data on the memory system; the data portion that has been modified subsequent to a performance of a previous scrubbing implementation; and the data portion that has been modified subsequent to the performance of the previous scrubbing implementation and further data portions located at least one of immediately preceding the data portion on a permanent media of the redundant mass storage system and immediately following the data portion on the permanent media.

The plurality of scrubbing selections may be represented as entries in a scrubbing table, the entries comprising an indication about at least one of the following: the respective scrubbing implementation; a location of the data portion on the memory system; and a timestamp indicating a time of a previous performance of the respective scrubbing implementation.

An implementation may include a method for ensuring integrity of data stored in a redundant mass storage system, comprising: defining in a memory system controller a scrubbing process for a memory system, the scrubbing process comprising one or more scrubbing selection types and a scrubbing implementation type associated with each scrubbing selection type; triggering the scrubbing process; identifying data portions as one of faulty and not faulty in accordance with an outcome of the one or more scrubbing processes; and repairing the data portions that the one or more scrubbing task identify as faulty.

Typically, the selection types may comprise a proper subset of an entire collection of data portions associated with the memory system.

In embodiments of the invention, at least two scrubbing processes may be defined and one of the scrubbing selection types may include selecting all data portions associated with the memory system.

There is further provided, according to an embodiment of the present invention, an apparatus for maintaining data integrity in a redundant mass storage system, comprising: a plurality of memory systems adapted to read and write data; a network adapted to interconnect the memory systems; and a memory management arrangement adapted to perform a plurality of scrubbing processes, at least two of the scrubbing processes being different.

An exemplary embodiment of the present invention provides a computer-readable storage medium containing a set of instructions for a general purpose computer. The set of instructions include a method for ensuring data integrity in a redundant mass storage system.

The present invention will be more fully understood from the following detailed description of the embodiments thereof, taken together with the drawings, a brief description of which is given below.

BRIEF DESCRIPTION OF THE DRAWINGS

FIG. 3 is a schematic diagram of a distribution table 19, which may be part of interface 26 as described in FIG. 1 above, according to an embodiment of the present invention;

FIG. 4 is a schematic diagram of a partition table 17, which may be part of cache 20 as described in FIG. 2 above, according to an embodiment of the present invention;

FIG. 5 is a schematic diagram of a scrubbing table 15, according to an embodiment of the present invention.

FIG. 7 is a schematic flowchart of a second algorithm 100 showing steps performed in storage system 10, according to an embodiment of the present invention;

DETAILED DESCRIPTION OF EMBODIMENTS

Figure 1:
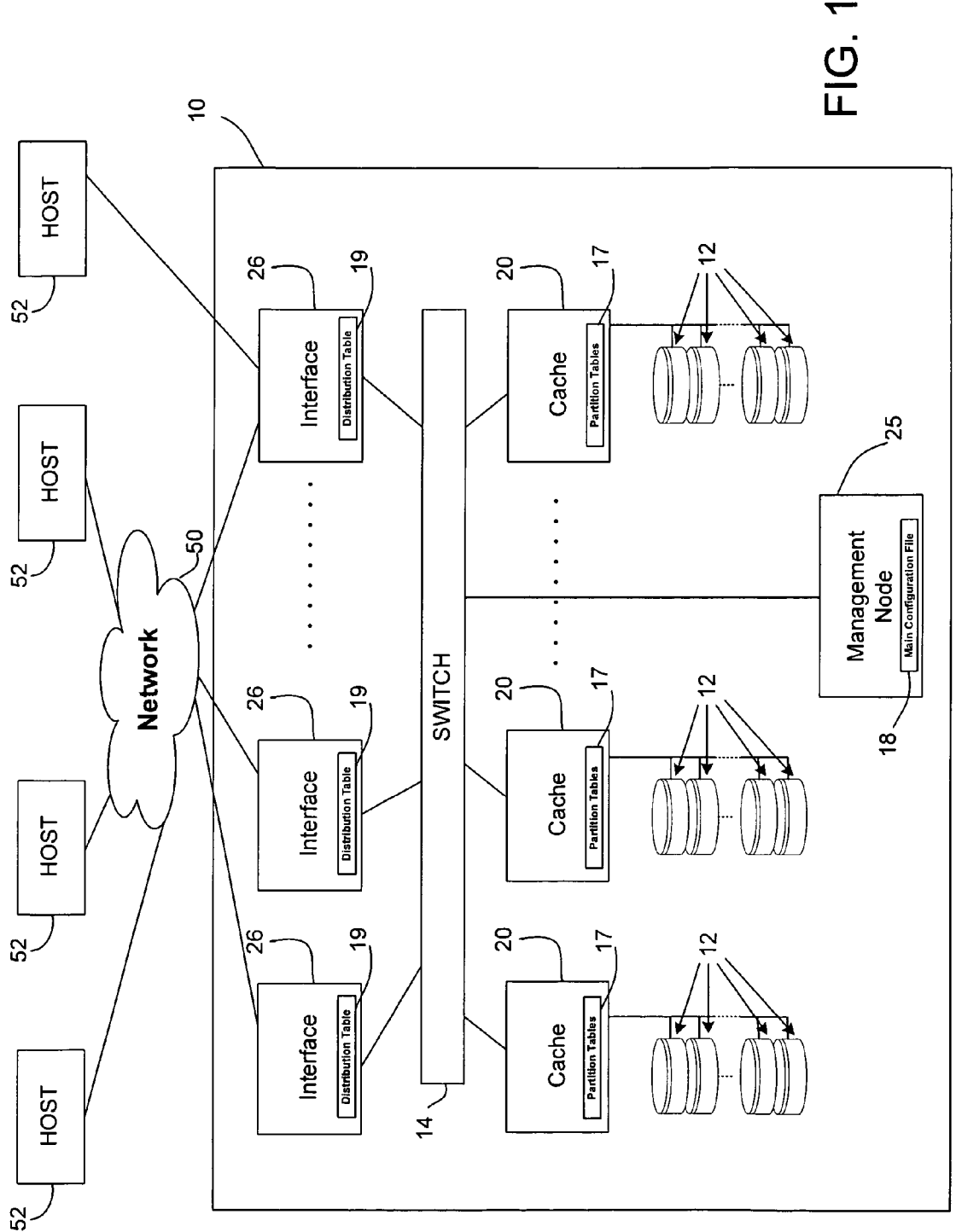
FIG. 1 is a schematic block diagram of a data storage system, according to an embodiment of the present invention.

Reference is now made to FIG. 1, which is a schematic block diagram of a storage system 10, according to an embodiment of the present invention. System 10 acts as a data memory for one or more hosts 52, which are coupled to the storage system by any means known in the art, for example, via a network such as the Internet or by a bus. Herein, by way of example, hosts 52 and system 10 are assumed to be coupled by a network 50. Data is stored within system 10 in logical units (LUs), comprising sequences of logical blocks associated with logical addresses (LAs). The contents of these blocks is stored in a distributed way across a group of slow and/or fast access time, non-volatile mass storage devices 12, hereinbelow assumed to be disks by way of example. As is described in more detail below, the data is stored redundantly, so that at least two copies of each block of data are stored in separate independently accessed disks 12. Hosts 52 access the data stored in disks 12 via input/output (IO) requests, which comprise IO read requests and IO write requests. In an IO read request the requested data is read from one of disks 12 wherein the data is stored. In an IO write request the data is written to at least two separate independently accessed disks 12.

System 10 may comprise a Management Node 25, typically implemented as one or more processing units, which may incorporate disks 12, and/or other elements of system 10, by methods which will be familiar to those skilled in the art. A Management Node 25 can be implemented as a combination of multiple units (not shown in this diagram), in which case the units typically control system 10 using a distributed algorithm operated in a cooperative manner.

System 10 may comprise one or more substantially similar interfaces 26 which receive IO read and write requests requiring access to disks 12 from hosts 52. Each interface 26 may be implemented in hardware and/or software, and may be located in storage system 10 or alternatively in any other suitable location, such as an element of network 50 or one of hosts 52.

Between disks 12 and the interfaces are a multiplicity of interim caches 20. Each cache may comprise memory having fast access time, and each cache may be at an equal level hierarchically. Each cache 20 typically comprises random access memory (RAM), such as dynamic RAM and/or solid state disks, as well as software. Each cache 20 is coupled to a respective sub-group of disks 12, in a one-cache-to-many-disks connection. Hereinbelow, specific caches 20 are also referred to as cache C1, cache C2, ... cache CN, ... where N is a natural number.

Caches 20 are coupled to interfaces 26 by any suitable fast coupling system known in the art, such as a bus or a switch, so that each interface is able to communicate with, and transfer data to and from, each cache, which is in turn able to transfer data to and from its sub-group of disks 12 as necessary. By way of example, the coupling between caches 20 and interfaces 26 is herein assumed to be by a first cross-point switch 14. Interfaces 26 operate substantially independently of each other. Caches 20 and interfaces 26 operate as a data transfer system, transferring data between hosts 52 and disks 12.

Consecutive blocks of a LU in system 10 are grouped into partitions, whose lengths are typically identical throughout the system. Thus a LU comprises consecutive strings of logical partitions which in turn comprise consecutive strings of logical blocks. In the embodiments of the invention described here, partitions are the basic data portions used to manage most data transactions herein, and in particular in scrubbing processes. Thus, the terms "partition" and "data portions" are used in equivalently and they may be freely interchanged throughout this document, including the claims.

System manager 25 assigns logical unit partitions to each cache 20, so that each cache is able to retrieve data from, and/or store data at, the range of LAs of its assigned partitions. The ranges are chosen so that the complete memory address space of disks 12 is covered. In a redundant storage such as described in the present invention, each partition is mapped to at least two caches, and to the disks 12 respectively associated with them. A method for redundantly mapping logical address ranges to caches, and the principles which may be used in embodiments of the present invention, is discussed in United States Patent Application Publication No. 2005/0015566, titled "Data Allocation in a Distributed Storage System," which is assigned to the assignees of the present invention and which is incorporated herein by reference.

The assigned partitions for each cache 20 are typically recorded in substantially similar tables 19 stored in each interface 26, and each table is used by its interface in routing IO requests from hosts 52 to the caches. Alternatively or additionally, the assigned partitions for each cache 20 are stored in each interface 26 as a substantially similar function, or by any other suitable method known in the art for generating a correspondence between partitions and caches. Hereinbelow, the correspondence between caches and partitions is referred to as distribution table 19, and it will be understood that table 19 gives each interface 26 a general overview of the complete cache address space of system 10. United States Patent Application Publication No. 2005/0015567, titled "Distributed Independent Cache Memory," which is assigned to the assignees of the present invention and which is incorporated herein by reference, describes a method that may be applied for generating tables such as table 19.

As described in more detail below, an IO request to access data is conveyed to a specific cache, and may be serviced by the cache itself, or by disks 12 connected to the cache. Thus, each cache acts on the IO requests conveyed to it substantially independently of the other caches; similarly, each cache communicates with its respective sub-group of disks substantially independently of communication between other caches and their respective sub-groups. Each cache 20 comprises a respective set of partition tables 17, specific to the cache; the function of tables 17 is described in more detail below.

Management node 25 may also maintain a Main Configuration Table 18 comprising information that is partly contained in tables 17 and partly in tables 19. In embodiments of the present invention, the management module 25 may produce configuration changes in the system by modifying table 18 and broadcasting the relevant, modified information to caches 20 and to interfaces 26, so that they will accordingly modify tables 17 and 19, respectively.

It should be stressed that straightforward redundancy achieved by keeping two or more copies of any data portion in the system, as described above, is only one possible way to protect data from individual component failure. Alternate protection schemes are known in the art, and they are usually classified as various levels of RAID (Redundant Array of Independent Disks). An article by Patterson, et. al, "A Case for Redundant Arrays of Inexpensive Disks," University of Berkeley (1988), contains a description of various data protection levels known in the art. Additional enhancements to the latter appear in "The RAIDbook, A Source Book For Disk Array Technology," Paul Massiglia, The RAID Advisory Board (6th Ed., 1999).

The present invention is described here for an implementation that uses data mirroring, but this is done for illustration purposes only, and it should be understood that there is nothing particular to such an implementation in regard with what is claimed as the invention. Thus, throughout this document, including the claims, the term "redundant data storage system" should be taken to signify any storage system in which data is protected against individual component failure, including, but not limited to, systems that implement data protection schemes that are described in the above mentioned RAID-related documents. The methods and apparatuses described hereinbelow can be easily adapted by anyone skilled in the art, so that they can be used in "redundant systems" in the broader sense intended here for the term.

Figure 2:
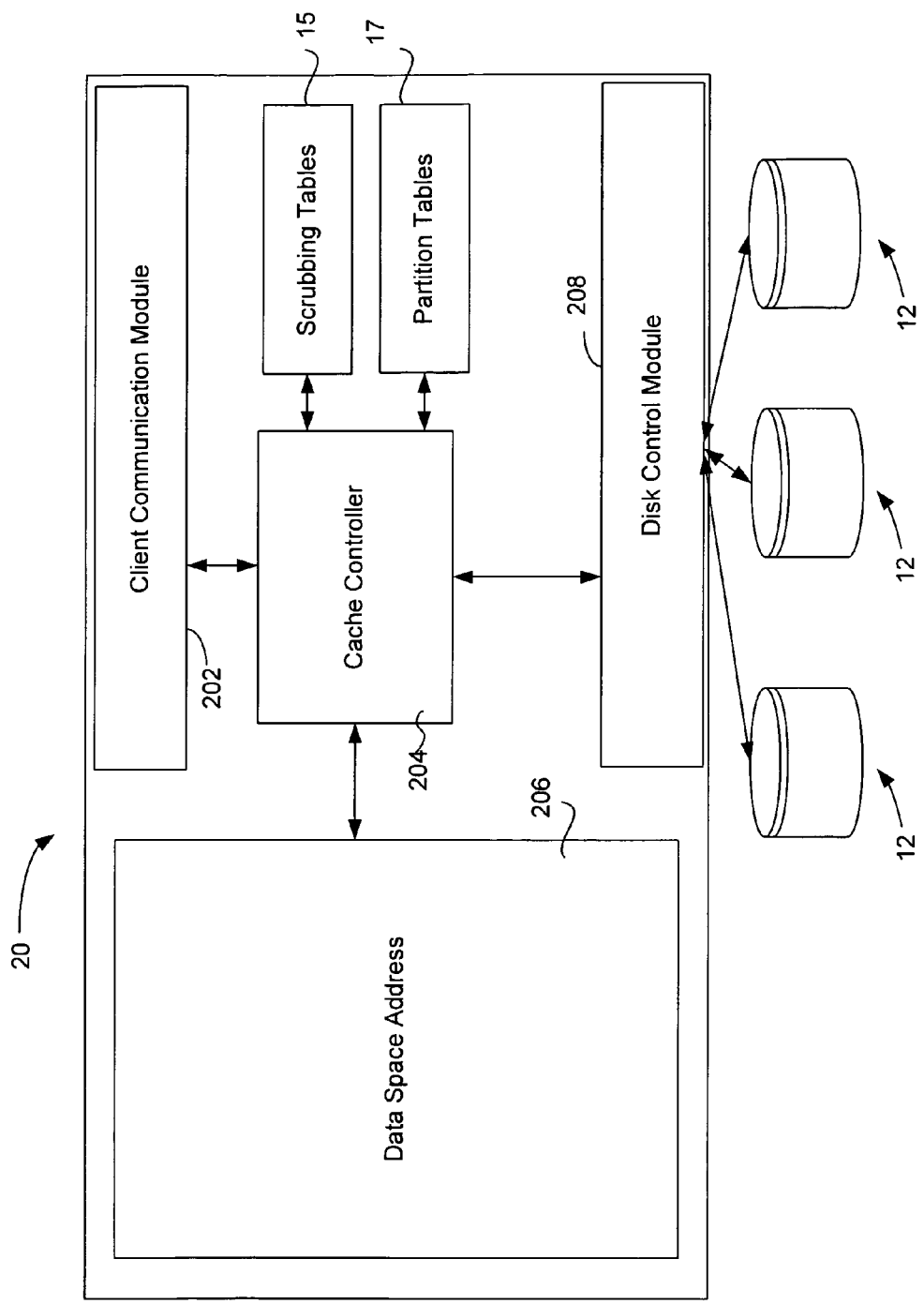
FIG. 2 is a schematic diagram of elements of cache 20 of FIG. 1, in accordance with an embodiment of the present invention.

FIG. 2 is a schematic diagram of elements of cache 20 of FIG. 1, in accordance with an embodiment of the present invention. The cache 20 may include a host communication module 202 which may be adapted to enable communications between the cache 20 and other components of storage system 10. By way of example, in an embodiment of this invention caches 20 communicate via switch 14 with other caches 20 and with interfaces 26. Communications with other components may include the receipt of service requests and the transmission of responses to the service requests, as well as the receipt and transmission of data. The cache 20 may further include a cache controller 204, adapted to manage the operation of the cache's various components and to fulfill the cache's various tasks. In addition the cache 20 may include a data space address 206, used to store data within the cache 20. Further, the cache may include a disk control module 208, operatively connected to the disks 12, and adapted to relay communications between the cache 20 and the disk 12 (in both directions). As already pointed out, in the present invention the cache acts as a disk controller. Cache 20 contains a set of partition tables 17 as well as a scrubbing table 15, whose function is described below in greater detail.

Whenever the interface 26 sends a partition to the cache 20 in order to be stored in one of the disks 12 associated with it, the cache controller 204 may store the data associated with that partition in the data address space 206 and it may at the same time create a corresponding entry in the partition tables 17. This entry may be used to manage the partition lifecycle while it exists in one of the disks 12 associated with cache 20. The cache 20 may eventually transmit to the disks, via disk control module 208, the data associated with the partition, and the data may be stored on the disk in a substantially permanent way. It is to be noted that, while this process is taking place in one of the caches 20 of system 10, according to an embodiment of the present invention, a process is substantially simultaneously being handled by at least a second cache 20 in the same system for the data associated with the same partition, so that when the process is completed, at least two copies of the data associated with the partition has been substantially permanently stored in the system.

FIG. 3 is a schematic diagram of a distribution table 19, which may be part of interface 26 as described in FIG. 1 above, according to an embodiment of the present invention. Column 210 may list partition IDs in the form of LU/partition-number. Column 212 may list the ranges of logical addresses of each partition in the form of LU/LA-range. Each partition LA range may be typically referred to by a first logical address and a range of addresses following on from the first address. Herein, to differentiate logical addresses from physical addresses, the former are prefixed by "L" and the latter by "P."

In the exemplary embodiment presented in FIG. 1, system 10 is a singly-redundant data storage system, so that a third column 214 and a fourth column 216 respectively may list a primary location and a secondary location associated with each logical partition listed in the table. Each location may be referred to by a cache number CN, and a disk number DN. The caches are selected from caches 20, the primary cache location being different from the second cache location. The disks are selected from all disks associated with the cache, and by way of example, we assume that 15 disks 12 are associated with each cache 20 in system 10. It will be understood that locations other than the primary and the secondary locations exemplified here may be associated with each partition, according to the amount of redundancy incorporated into system 10, all the respective caches being different from each other. Thus, for a doubly-redundant system, distribution table 19 may include a column having a tertiary location associated with each partition, the tertiary cache being different from the primary and secondary caches.

Each interface 26 may use its table 19 to direct IO requests received from hosts 52 to the caches 20. If the request is longer than a partition, the interface 26 may divide it accordingly into partition-length sub-requests and may handle each sub-request independently, according to the information gathered from table 19. If the IO request is a read request, the interface may typically transmit the IO request to the cache CN indicated by the primary location listed in table 19. If the IO request is a write request, the interface may transmit the request to all the caches indicated by the locations in table 19 that are listed for the logical address of the request.

FIG. 4 is a schematic diagram of a partition table 17, which may be part of cache 20 as described in FIG. 2 above, according to an embodiment of the present invention. The cache 20 contains one partition table 17 for each disk associated with it, and by way of example, 15 disks 12 are associated with each cache in system 10. The information contained in this table may be used by the cache 20 to transmit to a disk the data associated with a partition of an IO write request that has been directed at it, or to retrieve from a disk data associated with a partition of an IO read request that has been directed at it. When data associated with a partition reaches the cache 20, whether from an interface 26 or from another cache 20, the request also may indicate in what disk associated with this cache 20 the data is to be stored to or retrieved from. The cache controller 204 may use the information contained in table 17 associated with the disk, in order to transmit the data to the precise location on the disk or to retrieve the data therefrom, via the disk control module 208.

FIG. 4 is an exemplary, schematic diagram of partition table 17 of a disk, for instance D13, associated with a cache 20, for instance C9, in system 10. Table 17 may comprise columns 220 and 222 of partition numbers and logical ranges, similar to columns 210 and 212 of distribution table 19, in FIG. 3 described above. In this example, each column 220 and 222 may have entries for partitions of cache C9 only and of disk D13 only. Thus, in this example, partition table 17 for cache-disk C9-D13 does not have an entry for partition 24/YYY2 or for partition 25/ZZZ3 (mentioned in FIG. 3 as not belonging to this cache-disk). Similarly, partition table 17 for cache-disk C1-D7 has an entry for partition 25/ZZZ3 but does not have an entry for partition 26/TTT4. A column 224 may list the physical location assigned to the partition on the disk. By way of example, the physical location listed in column 224 may be in the form PXXXXX, where P indicates that the location is a physical address on the corresponding disk, here D13.

A column 226 may list an alternative cache 20 where the data of the partition of column 220 may be stored. The listing of column 226 corresponds to the locations listed in column 216 of table 19. It will be understood that for systems having more than single redundancy, corresponding further alternative partition locations may be listed in a column 228, or in additional columns added according as may be necessary. Thus, returning to FIG. 3, table 19 shows that the data for partition 24/YYY2 is located at cache-disk C9-D13 and cache-disk C5-D4. The partition table 17 of cache C9 shows, in FIG. 4, that the physical location of the data is at P2100AAA on disk D13 of the sub-group of disks associated with cache C9, and that an alternative location of the data is at cache C1, disk D4.

Still in FIG. 4, columns 230*a*, 230*b*, on partition table 17, may list indications relating to one or more scrubbing processes associated with this disk in embodiments of the present invention. As described below, in embodiments of the present invention, it is possible that more than one type of scrubbing processes be simultaneously defined for a disk. Column 230*a* is associated with a first process, and 230*b* is associated with a second process. Additional, similar columns may be added to table 17 for each additional scrubbing process defined for a disk with which the partition is associated, for example up to a maximum number allowed in the system. In an exemplary embodiment of the present invention, a scrubbing flag (SF) may be a bit whose value is 0 if the partition was already handled or should not to be handled as part of this process, and 1 if the partition is yet to be handled as part of the process. The embodiment may allow, for example, up to eight processes per disk, thus allocating one byte in table 17 for SFs. Alternatively, more or fewer processes may be provided for in partition table 17. Additional details on the use of SFs are provided hereinbelow.

In the system architecture and data distribution scheme described so far system 10 provides redundant storage for user data originating in hosts 52. At any point in time, the user may request any data partition stored in system 10, and the data will be read, according to the scheme described above, from its primary location. According to some embodiments of the present invention, it may also be another component of system 10 that is requesting the data for its own purposes. Thus for instance, system 10 may implement some internal mechanisms of volume copy creation, as known in the art. In all these cases, if for any reason a requested partition would become unavailable or corrupt, system 10 may still retrieve the data from the one or more alternative locations as indicated in tables 17 and 19. The scrubbing processes to be described hereinbelow as part of an embodiment of the present invention provides a mechanism to ensure that the two or more copies of all partitions in the system are continually available and contain correct, substantially identical data, so that when the need arises, the data associated with the alternative location of any partition will indeed be correctly retrieved and sent to the requester. It should therefore be stressed that the above description of data system 10 and the data distribution scheme associated with it is exemplary in nature and that the present invention is not limited to what has been particularly shown and described in this regard. The redundancy of the system may be created and managed in different ways, provided that more than one copy of each partition exists in the system and that in case of unavailability or data corruption for a partition, an alternative location exists wherefrom the data associated with the partition can be retrieved.

FIG. 5 is a schematic diagram of a scrubbing table 15, stored in a cache 20, according to an embodiment of the present invention. Column 231 may list an ID number to identify a scrubbing process currently defined for one of the disks associated with the cache 20 to which this table belongs. Column 232 may list the Disk number or ID of the drive on which the process is defined. Column 233 may list the Selection Type of this process, namely the kind of criteria on the basis of which data portions are selected to be handled as part of the process defined by this entry. Further details about possible kinds of Selection Types are provided hereinbelow. As will be seen below in greater detail, aspects of embodiments of the present invention comprise the ability to simultaneously implement more than one type of scrubbing process in the storage system 10, comprising different selection types. Thus, scrubbing table 15 may comprise more than one scrubbing process for any given disk, each comprising a different selection type. Column 234 may list the Implementation Type of this process, namely, the kind of scrubbing activity that will be implemented in this process. Further details about possible kinds of Implementation Types are provided hereinbelow. As will be seen below in greater detail, aspects of embodiments of the present invention comprise the ability to simultaneously implement more than one type of scrubbing process in the storage system 10, comprising different implementation types. Thus, scrubbing table 15 may comprise more than one scrubbing process for any given disk, each comprising a different implementation type. Column 235 may indicate the latest partition that was handled as part of a given scrubbing process on a given disk. Column 236 may contain an indication of a time stamp for the handling of the latest partition as indicated in column 235. Column 237 may contain an indication of a timestamp for the start of the last cycle of the scrubbing process, as will be described below. Thus for instance, in the example described in FIG. 5, scrubbing process 13 is defined in disk 4, cache 5, the latest partition handled in this cycle is 24/YY2, the cycle starting at time indicated by RRRRRR, and the partition being handled at a time indicated by TTTTT.

Figure 6:
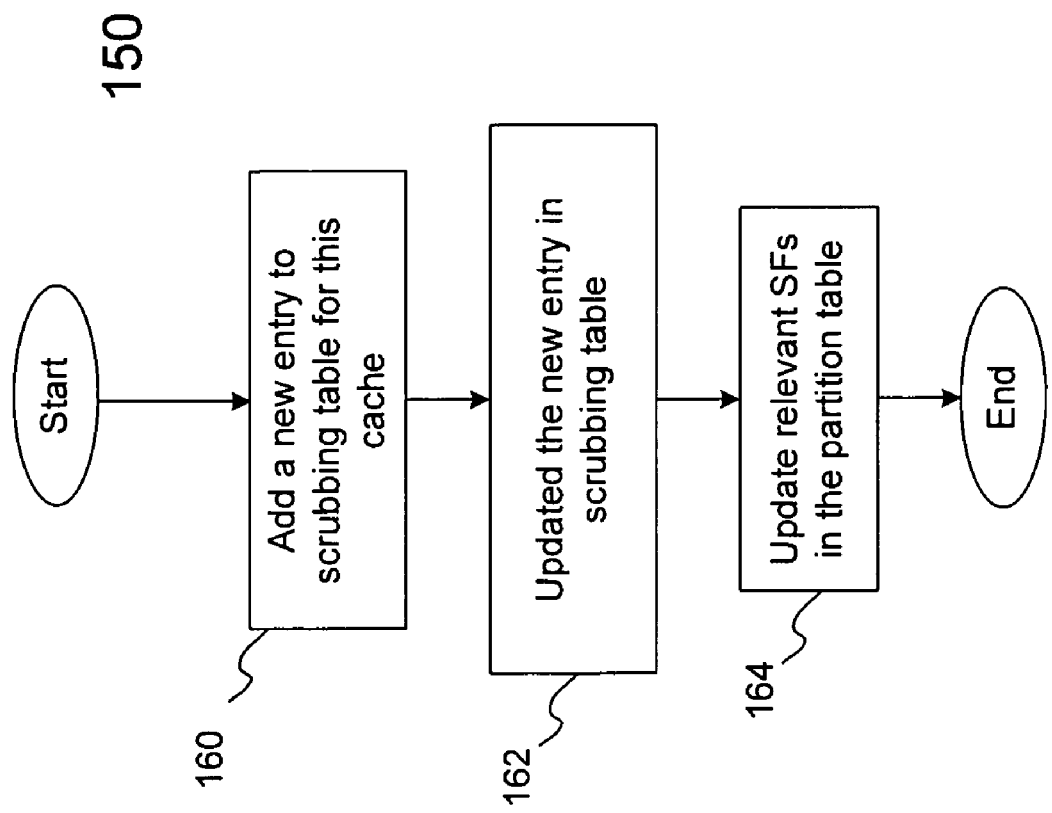
FIG. 6 is a schematic flowchart of an algorithm 150 showing steps performed in storage system 10, according to an embodiment of the present invention.

FIG. 6 is a schematic flowchart of an algorithm 150 showing steps performed in storage system 10, according to an embodiment of the present invention, whenever a new scrubbing process is defined for any disk in system 10. The creation of a new process for disk DN in cache CM may be started in management node 25, either by initiative of the user, via a user's interface, or by some automated process running in the module. A new scrubbing process may be started either at startup time for the system or at a later time at will. The creation process may necessitate indicating the ID of the disk in which the process is defined, as well as the selection type and implementation type of the new process. This creation process and the information associated with it may eventually reach the cache, and cache controller 204 may trigger algorithm 150.

In a first step 160, a new entry is added to scrubbing table 15 associated with cache CM. In a second step 162 the new entry is updated in the following procedure: the new scrubbing process may be given an ID which is written in column 231 of the new entry, the disk with which the process is associated may be written in column 232 of the entry, and the selection type and implementation type may be written in columns 233 and 234, respectively. The ID of the logical partition associated with the first physical partition of this disk may be written in column 235, so that the scrubbing process may start from the beginning and may eventually move all along the list of partitions, as indicated in table 17 for disk DN in cache CM. Likewise the current system time may be written in columns 236 and/or 237.

In a third step 164 of algorithm 150, table 17 associated with disk DN in cache CM may be updated. This comprises updating the SFs in one of the one or more columns 230, that may be now associated with the newly created process associated with disk DN in cache CM. For the sake of illustration, only one process is associated with the disk, and that the newly defined process is a second process associated with it. The SFs that may be now updated are those indicated in column 230*b*, associated with the second process for this disk. The precise way in which the SFs are updated in this step 164 depends on the scrubbing selection type that has been defined for this new process, and additional details about various ways of defining scrubbing selection types are provided hereinbelow.

After step 164 is completed, algorithm 150 ends and the creation of the new task is completed.

FIG. 7 is a schematic flowchart of algorithm 100 showing steps performed in storage system 10, according to an embodiment of the present invention. The scrubbing process described here may be handled by the cache 20, which acts, among other things, as disk controller via the disk control module 208. Within the cache 20, cache controller 204 is adapted to activate a scheduling mechanism that coordinates the execution of several kinds of cache tasks, such as controlling the data portions to be retrieved to and discarded from the data space address 206, establishing and maintaining communications with other system components via the client communication module 202, and other tasks as are known to those of ordinary skill in the art. Scrubbing processes may be one of the tasks scheduled and activated by the cache controller 204. Thus, at any point in time, according to considerations of internal activity, workload, task priority definitions, and other parameters, the controller may decide to currently devote the cache resources to perform a scrubbing task in this cache. Once this decision is taken, additional parameters, such as for example information gathered from scrubbing table 15, may be used by the cache controller to select one among the scrubbing processes defined in the table to be the scrubbing process that is handled now. Flowchart 100 describes the steps comprised in handling such a scrubbing task for a selected scrubbing process, for instance, process j, corresponding to disk DN.

In a first step 110, cache controller 204 looks for the entry in scrubbing table 15 that corresponds to process j. This is indicated by column 231, in the line whose value is j, namely the ID of the current process. In that entry, the value indicated in column 235, say LUNA/PPPPP, may contain an indication of the latest partition of DN handled in this process.

In the next step 112, cache controller 204 may look in table 17 for the next partition in line after LUNA/PPPPP, so that it may be considered as a candidate for scrubbing. Controller 204 may check if LUNA/PPPPP is the partition appearing in the last entry of table 17. If it is not the partition appearing in the last entry of table 17, then in a next step 113, controller 204 may look at the partition indicated by the new entry in table 17, immediately following LUNA/PPPPP, say LUNB/PPPPQ. This is the partition that can now be considered as candidate for scrubbing as part of this process.

In the next step 114, cache controller 204 may find out if partition LUNB/PPPPQ should indeed be handled as part of scrubbing process j. This may be done, for instance, by looking at the SF that corresponds to process j in columns 230 (for instance, column 230*b*), in the entry associated with LUNB/PPPPQ in partition table 17. If the value of column 230*b* for the entry corresponding to process j is set to 1 when it is checked in step 114, then it is understood that this partition has been indicated (i.e., in step 164 of algorithm 150) as a partition that must be handled as part of scrubbing process j. In this case, in step 116, the cache controller 204 executes the necessary steps of the scrubbing task for partition LUNB/PPPPQ. Step 116 consists in performing the scrubbing task according to the scrubbing implementation type defined for process j, as may be indicated in column 234 of table 15, in the entry corresponding to process j, in an exemplary implementation of the present invention. Additional details are provided hereinbelow concerning possible scrubbing implementation types that may be used in implementation of the present invention.

After completion of step 116, some of the table entries may be updated so as to prepare the information for the next scrubbing process to be handled in the cache. Thus in a next step 118 of some embodiments of the present invention, in the entry corresponding to process j, column 235 may be updated to indicate that partition LUNB/PPPPQ was the last one to be handled by this process and, subsequently, column 236 may be updated to indicate the time at which this was done. Likewise, as part of the same step 118 of some embodiments of the present invention, in the entry corresponding to partition LUNB/PPPPQ in table 17 of the cache and disk currently handled, the corresponding bit in columns 230 may be updated to indicate that this partition was handled, so that it will not be handled again as part of a similar scrubbing process until the next cycle of such a process is initiated. The next cycle of the process is initiated when in step 112 it turns out that a partition examined was the last entry of table 17.

If in step 112 the partition examined, say LUNA/PPPPP, was the last entry of table 17, then a new cycle of process j is initiated in a further step 120. Initiating a new cycle of the process may comprise updating columns 235, 236 and 237 of table scrubbing table 15 in the entry corresponding to this process. In column 235 controller 204 may write the ID of the first partition appearing in table 17 for disk DN in cache CN. In column 236 and 237 controller 204 may write the current system time. The timestamp written in column 236 may eventually be further updated in step 116, whereas column 237 will be further updated only when a new cycle of this process will be initiated, next time that this step 120 is reached as part of algorithm 100. Further, as part of the initialization of a new cycle of process j in this step 120, the relevant SFs in partition table 17 for disk DN in cache CM may be updated. In the present example, entries in column 230 may be updated, and this is done in accordance with the scrubbing selection type defined for this process. Like in step 164 of algorithm 150, the precise way in which the SFs are updated in this step 120 depends on the scrubbing selection type that has been defined for this new process, and additional details about various ways of defining scrubbing selection types are provided hereinbelow. Once step 120 is completed the algorithm is ready to continue handling the next partition in line to be considered as candidate for scrubbing, and it moves to step 114.

In step 114 of algorithm 100 in the exemplary implementation being described here, if the value indicated in columns 230a, 230b, etc. of the entry corresponding to this process for LUNB/PPPPQ in partition table 17 is not set to 1, then it is understood that this partition need not be handled as part of scrubbing process j. In this case, algorithm 100 returns to step 112.

Following step 118, algorithm 100 is completed and control may be returned to the scheduler of cache controller 204, which may decide which next cache activity to perform. Eventually, a decision of performing a scrubbing task may be reached again and the cache controller 204 will perform algorithm 100 for the scrubbing process chosen at that time. Typically, cache embodiments in storage systems comprise mechanisms to avoid starvation of scrubbing as a whole and of each of the individual scrubbing processes listed in scrubbing 15, so that under most or all workload conditions that may possibly happen in the system, none of these processes may remain unrealized after long periods of time. Such starvation-avoidance mechanisms are well-known to anyone skilled in the art and are therefore not described here.

A detailed description of embodiments of the present inventions necessitates providing details of possible definitions of scrubbing selection types and of scrubbing implementation types. A non-exhaustive list of possible exemplary definitions of scrubbing selection types follows:

Full Selection (FS): if the scrubbing selection type of process j is defined as FU, then all data partitions in the disk are to be selected as partitions that need to be handled by process j. In this case, in step 164 of algorithm 150, or in step 120 of algorithm 100, all SFs of the relevant column 230 are set to 1.

Random Choice (RC): if the scrubbing selection type of process j is defined as RC, then only some data partitions in the disk are to be selected as partitions that need to be handled by process j. This may be done in a random manner, or by a rule such as every second partition, every third partition, or taking any other size of the step to skip from partition to partition. In this case, in step 164 of algorithm 150 or in step 120 of algorithm 100, only SFs of selected partitions of the relevant column 230 are set to 1.

Recently Modified (RM): if the scrubbing selection type of process j is defined as RM, then the only data partitions selected in the disk to be handled by process j are those that were modified during the current cycle of process j. In this case, in step 164 of algorithm 150 or in step 120 of algorithm 100, no SF of the relevant column 230 is set to 1. However, whenever a partition in disk DN, say PT, is modified as part of a write process in the system, then the SF in the entry corresponding to PT in table 17 may be set to 1 by controller 204.

Recently Modified and Adjacent (RMA): if the scrubbing selection type of process j is defined as RMA, then the only data partitions selected in the disk to be handled by process j are those that were modified during the current cycle of process j, and partitions that are adjacent to it. In this case, in step 164 of algorithm 150 or in step 120 of algorithm 100, no SF of the relevant column 230 is set to 1. However, whenever a partition in disk DN, say PT, is modified as part of a write process in the system, then the SF in the entry corresponding to PT in table 17, as well as the SF corresponding to the partition immediately preceding PT in table 17 and the partition immediately following PT in table 17 may be set to 1 by controller 204.

In an exemplary method of the present invention, scrubbing processes are to be applied to proper sub-sets, rather than to the entire collection, of data portions in a scrubbing cycle. Moreover, in an exemplary embodiment of the present invention, more than one selection type may be utilized. In particular, two or more substantially different scrubbing processes may be simultaneously implemented in the storage system.

Scrubbing implementation types may be characterized by two separate activities: identifying faulty partitions and repairing faulty data partitions. A non-exhaustive list of possible exemplary ways of identifying faulty partitions as part of scrubbing implementation types comprise the following:

Read Attempt: the disk control module 208 attempts to read the partition. If the attempt is successful, the partition is declared "non-faulty". If the attempt fails, the partition is declared faulty. Failure to read may be defined either as plain failure to read, or failure to read within a pre-defined time limit.

Verify Attempt: the disk control module 208 issues a "verify" command for the partition. A "verify" command is meant here to comprise any command as known in the art that can check if a read command can be performed but does not actually read the data. Rather it just returns a value: "success" or "fail". The partition is considered as "non-faulty" or "faulty" accordingly.

Read and Compare: the disk control module 208 attempts to read the partition. At the same time it sends a message via the client communication module 202 to an alternative location where a copy of this partition is found. The alternative location is indicated by the contents of columns 226, etc. in the partition table 17 of this disk. The cache of the alternative location reads the partition in its disk and transmits the content to the local cache. A partition is declared non-faulty if the local partition can be read successfully, if the remote partition can be read successfully, and if it is determined that the contents of both the local and remote partition is the same. A partition is declared as faulty if either the local partition cannot be read successfully, or if the remote partition cannot be read successfully, or if it is determined that the contents of both the local and remote partition are not the same.

Verify Checksum: under the name "checksum" it is meant here any system known in the art that uses metadata to verify data portions. For example, if a data portion comprises eight data blocks, it can be agreed for a system, to use the eighth block as a parity block for checksum. The value stored in that block is calculated by XOR-ing the other seven blocks in the portion. At any point in time a check (also referred to as a sanity check) may be performed by calculating the XOR of the first seven blocks of the portion and comparing the result with the parity block. This technique can be generalized by XOR-ing a different amount of blocks or by XOR-ing bytes rather than blocks. Another technique known in the art is called Cyclic Redundancy Check (CRC), whereby the value stored in a parity block or parity byte is calculated with the help an algebraic technique involving irreducible polynomials. Checksums can be used in the present invention as follows: the disk control module 208 performs a sanity checksum using any of the approaches known in the art. If the sanity checksum succeeds, then the portion is declared "nonfaulty". If the sanity checksum fails, then the portion is declared "faulty".

Verify and Compare Checksum: this method includes features of both Verify Checksum and "Read and Compare". A sanity checksum is not only performed in the local copy of the data portion, but also in the alternative one, as indicated by columns 226, etc. in the partition table 17 of this disk, as in the "Read and Compare" approach. A partition is declared non-faulty if the local copy of the data portion passes the sanity check, if the remote copy of the data portion passes the sanity check, and if it is determined that the contents of the value stored in parity data of both the local and remote partition is the same. A partition is declared non-faulty if either the local copy of the data portion does not pass the sanity check, or if the remote copy of the data portion does not pass the sanity check, or if it is determined that the contents of the value stored in parity data of both the local and remote partition is not the same.

A non-exhaustive list of possible exemplary methods of repairing faulty partitions as part of scrubbing implementation types includes the following: take no action (an approach that may conveniently be followed in certain situations); inform the system manager of the existence of a faulty situation; and/or overwrite a copy of the data portion that has been declared faulty with the data currently stored in an alternative location.

The present invention is further described by assembling some of the alternative elements described above in one systematic, exemplary embodiment. Thus, for instance, a system 10 as described above, with two possible scrubbing selection types implemented in the system: FS (Full Selection) and RM (Recently Modified). Further, these two selection types are applied to all disks in the system. The cache controller 204 schedules scrubbing tasks with low priority, so that they are triggered substantially only when there are no read or write requests waiting to be processed at the cache. Controller 204 also implements starvation-avoidance mechanisms, so that scrubbing tasks are nevertheless triggered with low frequency, even in situations of high workload in the system when there are no periods of time without read or write activity. When a scrubbing task is triggered, the controller performs the scrubbing task at a time for each disk in the cache according to their serial ID within the cache, from 0 to 15. Within each disk, the controller performs a full scrubbing cycle for the FS selection type and only when the cycle has been completed it performs two successive, full scrubbing cycles of the RM selection type. When the second RM cycle has been completed the turn will come again for the FS type. Thus, a balance is implemented in each disk between checking all partitions, and checking, with some higher frequency, those that have been modified and are thus more likely to fail. In an alternative implementation, a third selection type RMA (Recently Modified and Adjacent) cycle could be defined instead of the second RM cycle. This would also give some priority to checking partitions that are adjacent to recently modified partitions, and that, in accordance with the lessons of experience in the art, may also have a higher tendency than other portions to become faulty. Within the scrubbing task, the "verify" approach may be followed as part of the scrubbing implementation type, in order to identify faulty portions. Then, when such a faulty portion is identified, it may be corrected by overwriting with the data found in the remote copy of that portion, found in the alternative location. Additionally, an alert message may be issued to the user.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

We claim:

1. A method for data storage, comprising:
    creating a scrubbing table comprising entries corresponding to a plurality of scrubbing processes to be run in a data storage system, which comprises multiple disks on which data are redundantly stored,
    wherein each entry identifies a selection of data portions for handling by a corresponding scrubbing process and identifies an implementation type of a plurality of implementation types, each implementation indicating a kind of scrubbing activity to be preformed by the corresponding scrubbing process;
    inserting in the scrubbing table at least a first entry corresponding to a first scrubbing process to be applied to a first set of the data portions and a second entry corresponding to a second scrubbing process to be applied to a second set of the data portions; and
    reading the entries from the scrubbing table and responsively to the first and second entries, respectively, running at least the first and second scrubbing processes concurrently to identify and repair the faulty data partitions in the first set of the data portions, and identify and repair the fault data partitions in the second set of the data portions.

2. The method according to claim 1, wherein each entry identifies a selection type of a plurality of selection types, each selection type indicating a criterion for selection of the data portions for handling by the corresponding scrubbing process.

3. The method according to claim 2, wherein the selection type is one of:
    a full selection type, in which all data partitions in a specified disk are selected for handling by the corresponding scrubbing process;
    a random choice type, in which the data partitions for handling by the corresponding scrubbing process are selected at random; and
    a recently-modified type, in which the data partitions that were modified recently are selected for handling by the corresponding scrubbing process.

4. The method according to claim 3, wherein the selection is a recently-modified-and-adjacent type, in which first data partitions that were modified recently are selected together with second data partitions that are adjacent to the first data partitions for handling by the corresponding scrubbing process.

5. The method according the claim 2, wherein at least two of the plurality of the scrubbing processes running concurrently have different, respective selection types.

6. The method according to claim 1, wherein inserting at least the first and second entries in the scrubbing table comprises adding a new entry to the scrubbing table while at least one of the scrubbing processes previously entered in the scrubbing table is running.

7. The method according to claim 1, wherein reading the entries comprises cycling over the entries in the scrubbing table in sequence, and wherein running at least the first and second scrubbing processes comprises, for each of the entries in the sequence, selecting a next one of the data apportions and initiating a scrubbing task of the respective implementation type to be applied to the selected one of the data portions.

8. The method according to claim 7, wherein each of the entries comprises a respective timestamp indicating a time of a previous performance of the scrubbing activity indicated by the entry.

9. The method according to claim 1, wherein the entries in the scrubbing table specify different scrubbing processes to be applied to a single one of the disks.

10. The method according to claim 1, wherein the first and second scrubbing processes are different ones of:
    a read attempt, in which there is an attempt to read data;
    a verify attempt, in which a read command for the data is checked;
    a read and compare, in which the data is read and compared to a copy of the data;
    a verify checksum, in which metadata is used to verify the data; and
    a verify and compare checksum, in which metadata is used to verify the data and the data is read and compared to the copy of the data.

11. A method for data storage, comprising:
    selecting first data for scrubbing utilizing one of a full selection process in which all data partitions in a specified disk are selected, a random choice process in which data are selected at random, and a recently-modified process in which the data partitions that were modified recently are selected;
    applying one of a read attempt scrubbing process in which there is an attempt to read the selected first data, a verify attempt scrubbing process in which a read command for the selected first data is checked, a read and compare scrubbing process in which the selected first data is read and compared to a copy of the selected first data, a verify checksum scrubbing process in which metadata is used to verify the selected first data, and a verify and compare checksum scrubbing process in which metadata is used to verify the selected first data and the selected first data is read and compared to the copy of the selected first data, to determine if the selected first data includes a first fault;
    selecting second data for scrubbing utilizing a different one of the full selection process, the random choice process, and the recently-modified process; and
    applying a different one of the read attempt scrubbing process, the verify attempt scrubbing process, the read and compare scrubbing process, the verify checksum scrubbing process, and the verify and compare checksum scrubbing process to the selected second data to determine if the selected second data includes a second fault.

12. The method of claim 11, further comprising:
    repairing the first selected data if the first selected data includes the first fault; and
    repairing the second selected data if the second selected data includes the second fault.

13. The method of claim 12, wherein:
    repairing the first selected data comprises one of informing a system manager of the first fault and overwriting the selected first data with the copy of the first selected data stored in another location; and
    repairing the second selected data comprises one of informing the system manager of the second fault and overwriting the selected second data with the copy of the second selected data stored in another location.

* * * * *